(12) United States Patent
Jones et al.

(10) Patent No.: US 11,448,086 B2
(45) Date of Patent: Sep. 20, 2022

(54) VARIABLE STATOR VANE AND METHOD OF FABRICATING VARIABLE STATOR VANE

(71) Applicant: ROLLS-ROYCE plc, London (GB)

(72) Inventors: Christopher D. Jones, Bristol (GB); Robert C. Backhouse, Wells (GB); Adam J. Bishop, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 17/169,871

(22) Filed: Feb. 8, 2021

(65) Prior Publication Data
US 2021/0254493 A1    Aug. 19, 2021

(30) Foreign Application Priority Data
Feb. 14, 2020 (GB) ...................................... 2002044

(51) Int. Cl.
*F01D 17/16* (2006.01)
*B29C 53/42* (2006.01)
(Continued)

(52) U.S. Cl.
CPC .............. *F01D 17/16* (2013.01); *B29C 53/42* (2013.01); *B29L 2031/08* (2013.01);
(Continued)

(58) Field of Classification Search
CPC .......... F01D 17/16; F01D 5/282; F01D 5/147; F01D 5/188; F01D 5/189; B29C 53/42; B29C 66/7212; B29C 66/721; B29C 70/32; B29L 2031/08; F05D 2230/26; F05D 2240/12; F05D 2250/90; F05D 2300/603; F05D 2300/6034

See application file for complete search history.

(56) References Cited

U.S. PATENT DOCUMENTS 8,202,043 B2 * 6/2012 McCaffrey ............ F01D 17/162
  415/160
2005/0238491 A1    10/2005 Morrison et al.
(Continued)

FOREIGN PATENT DOCUMENTS

EP    3241993 A1    11/2017
EP    3260280 A1    12/2017
(Continued)

OTHER PUBLICATIONS

Great Britan search report dated Aug. 11, 2020, issued GB Patent Application No. 2002044.2.
(Continued)

*Primary Examiner* — Ninh H. Nguyen
*Assistant Examiner* — Eric J Zamora Alvarez

(57) ABSTRACT

The present disclosure relates to a variable stator vane and a method of fabricating the variable stator vane of a gas turbine engine. The method includes providing at least one fibre sheet. The method further includes rolling the at least one fibre sheet around a mandrel to form a spindle section of the variable stator vane. An excess of material of the at least one fibre sheet remains after forming the spindle section. The method further includes using the excess of material of the at least one fibre sheet to form the at least one aerofoil section of the variable stator vane.

20 Claims, 15 Drawing Sheets

(51) Int. Cl.
　　　　*F01D 11/00*　　　(2006.01)
　　　　*F01D 5/28*　　　　(2006.01)
　　　　*F01D 5/14*　　　　(2006.01)
　　　　*B29L 31/08*　　　(2006.01)

(52) U.S. Cl.
　　　　CPC ...... *F05D 2230/26* (2013.01); *F05D 2240/12* (2013.01); *F05D 2250/90* (2013.01); *F05D 2300/603* (2013.01)

(56) References Cited

U.S. PATENT DOCUMENTS

2016/0003072 A1* 1/2016 Chang .................... F01D 5/284
　　　　　　　　　　　　　　　　　　　　　　　　　415/200
2017/0320232 A1* 11/2017 de Diego ............... F01D 5/147

FOREIGN PATENT DOCUMENTS

| EP | 3415717 A1 | 12/2018 |
| EP | 3564498 A1 | 11/2019 |
| EP | 3650659 A1 | 5/2020 |
| WO | 2017215735 A1 | 12/2017 |

OTHER PUBLICATIONS

European search report dated Jun. 10, 2021, issued in EP Patent Application No. 21151614.

* cited by examiner

VARIABLE STATOR VANE AND METHOD OF FABRICATING VARIABLE STATOR VANE

CROSS-REFERENCE TO RELATED APPLICATIONS

This specification is based upon and claims the benefit of priority from United Kingdom Patent Application Number 2002044.2, filed on 14 Feb. 2020, the entire contents of which are incorporated herein by reference.

BACKGROUND

Technical Field

The present disclosure relates to variable stator vanes and methods of fabricating variable stator vanes.

Description of the Related Art

Gas turbine engines typically includes multiple stator and rotor stages. A stator includes multiple stator or guide vanes. The stator vanes serve to guide a gas stream passing through the gas turbine engine so that the gas stream takes on appropriate speed and angle. Some stator vanes are said to be variable stator vanes (VSVs), for example variable inlet guide vanes (VIGVs). Such vanes may be rotatable about an axis of the vane in order to adjust the angle formed between the airflow and the leading edge of the vane.

Stator vanes are generally made of metal (for example, titanium). In some cases, stator vanes may also be manufactured using composite material. However, conventional methods of fabricating stator vanes out of metal material or out of composite material may suffer from drawbacks.

For example, the tooling used for fabricating metal stator vanes may be expensive and may require a complex and a time-consuming manufacturing process. Such stator vanes are typically obtained by casting, which requires two different mould bodies, namely a permanent body that is expensive and time-consuming to fabricate and that requires treatment against wear, and a body made of sand with an agglomerating agent which may have to be remade frequently. Stator vanes manufactured using casting may further require a finishing process by machining or by chemical treatment.

Stator vanes made of composite material may be made in various ways. For example, a manual laminating/draping method, a moulding method that includes injecting a fibre preform (known as resin transfer moulding (RTM)), a method of infusion with liquid resin, an embroidery method (also known as tailored fibre placement), a thermo-compression method or another method may be used. These methods may be expensive and complex.

There is therefore a need for an improved method of fabricating stator vanes that address these and/or other problems.

SUMMARY

According to a first aspect of the present disclosure, there is provided a method of fabricating a variable stator vane. The method includes providing at least one fibre sheet; and rolling the at least one fibre sheet around a mandrel to form a spindle section of the variable stator vane. An excess of material of the at least one fibre sheet remains after forming the spindle section. The method further includes using the excess of material of the at least one fibre sheet to form at least one aerofoil section of the variable stator vane.

The method may eliminate the need to use a metallic spindle, for example, a titanium spindle. This can reduce weight and cost of the variable stator vane. The method may also allow the use of hollow spindles. Further, a machining process required to produce spindles can be eliminated. In other cases, a hybrid solution with a titanium spindle section can reduce the weight of the variable stator vane, perhaps by around 40-50% as compared to conventional metallic stator vanes. By replacing the titanium with a composite material, a further weight reduction of approximately 10% may be possible.

The method of fabricating the variable stator vane may be cost effective and time efficient. The method may also reduce the weight of the variable stator vane as compared to variable stator vanes manufactured by conventional methods. The method may also reduce or eliminate tooling costs generally associated with conventional methods. The method may also eliminate a final machining step that is required in some methods.

Rolling the at least one fibre sheet around the mandrel may include rolling a plurality of turns of the fibre sheet around the mandrel.

The method may further include wrapping the excess of material of the at least one fibre sheet around one or more inserts.

Rolling the at least one fibre sheet around the mandrel may include rolling a turn of the fibre sheet around an insert so that the insert is disposed between two adjacent turns of the spindle section.

The method may further include providing a further fibre sheet over the spindle section and the at least one aerofoil section to provide an outer layer of the variable stator vane.

Using the excess of material may further include pressing the excess of material of the at least one fibre sheet between a female aerofoil tool and a male aerofoil tool.

The at least one fibre sheet may include a first fibre sheet and a second fibre sheet. Rolling the at least one fibre sheet may further include rolling the first fibre sheet and the second fibre sheet around the mandrel to form the spindle section. A first excess of material from the first fibre sheet may remain after forming the spindle section and a second excess of material from the second fibre sheet may remain after forming the spindle section.

The at least one aerofoil section may include a first aerofoil section and a second aerofoil section. Using the excess of material may include using the first excess of material to form the first aerofoil section and using the second excess of material to form the second aerofoil section.

The method may further include applying a resin on the spindle section and the aerofoil section. The resin applied on the spindle section and the aerofoil section may seal the fibres of the variable stator vane.

The at least one fibre sheet may include a carbon fibre sheet.

The method may further include, prior to rolling the fibre sheet, impregnating the fibre sheet with a polymeric material or applying a polymeric material to the fibre sheet. Optionally, the polymeric material may be cured. The polymeric material optionally includes a resin or a binder.

According to a second aspect, there is provided a variable stator vane including a spindle section formed from at least one continuous fibre sheet wrapped around a spindle axis of the variable stator vane and at least one aerofoil section at least partially formed from an excess of material from the at least one continuous fibre sheet.

The spindle section may include a plurality of turns of the continuous fibre sheet wrapped around the spindle axis.

The variable stator vane may further include at least one insert. The at least one insert may be disposed between adjacent turns of the spindle section.

The variable stator vane may further include an outer layer of fibre sheet disposed over the spindle section and the at least one aerofoil section.

The at least one continuous fibre sheet may be disposed around the mandrel. In some examples, the mandrel may be removed after fabrication for weight reduction. Alternatively, if additional strength is required, the mandrel may be left in situ. In such cases, a film adhesive may be added to the spindle section.

The at least one continuous fibre sheet may include a first continuous fibre sheet and a second continuous fibre sheet. The spindle section may be formed from the first continuous fibre sheet and the second continuous fibre sheet rolled around the spindle axis.

The at least one aerofoil section may include a first aerofoil section and a second aerofoil section. The first aerofoil section may be at least partially formed from an excess of material from the first continuous fibre sheet. Second aerofoil section may be at least partially formed from an excess of material from the second continuous fibre sheet.

The variable stator vane may further include a top bushing attached to a top end of the spindle section. The top bushing may elongate in a direction that is perpendicular to the spindle axis.

The top bushing may be an actuation point for the variable stator vane. In some examples, the top bushing can be square. A lever may be attached to the top bushing. Further, the lever may be attached to an actuating ring to which other variable stator vanes may be attached in a same manner, such that all the variable stator vanes actuate simultaneously and to a same degree. The top bushing may require an internal form or shape to accept the spindle section such that actuation can be achieved. The internal form may be designed to avoid failure at an interface between the top bushing and the spindle section. In some cases, the internal form of the top bushing may be created during moulding. In some other cases, the top bushing may be a micro-splined bushing that has an interference fit with the spindle section.

The variable stator vane may further include a bottom bushing attached to a bottom end of the spindle section. The bottom bushing may be used for location only and may be circular.

The at least one continuous fibre sheet may include a carbon fibre sheet.

The at least one continuous fibre sheet may include a biaxial fibre sheet.

According to a third aspect, there is provided a gas turbine engine including the variable stator vane of the second aspect.

In some examples, the variable stator vane including the spindle section and the aerofoil section may be made of a composite material which may reduce the mass of the variable stator vane as compared to a variable stator vane made of metal, such as titanium.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm. The present disclosure may also be applied to smaller engines, for example engines having a fan diameter greater than or equal to 90 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm. In some other examples, the rotational speed of the fan may be as high as 25000 rpm to 30000 rpm, for example in smaller engines.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
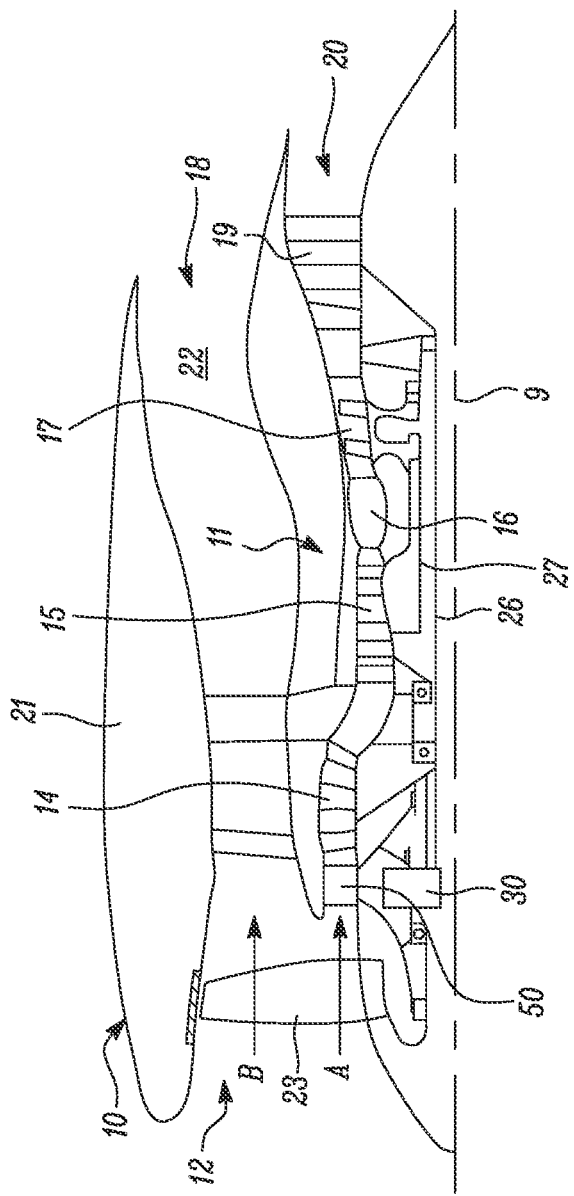
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
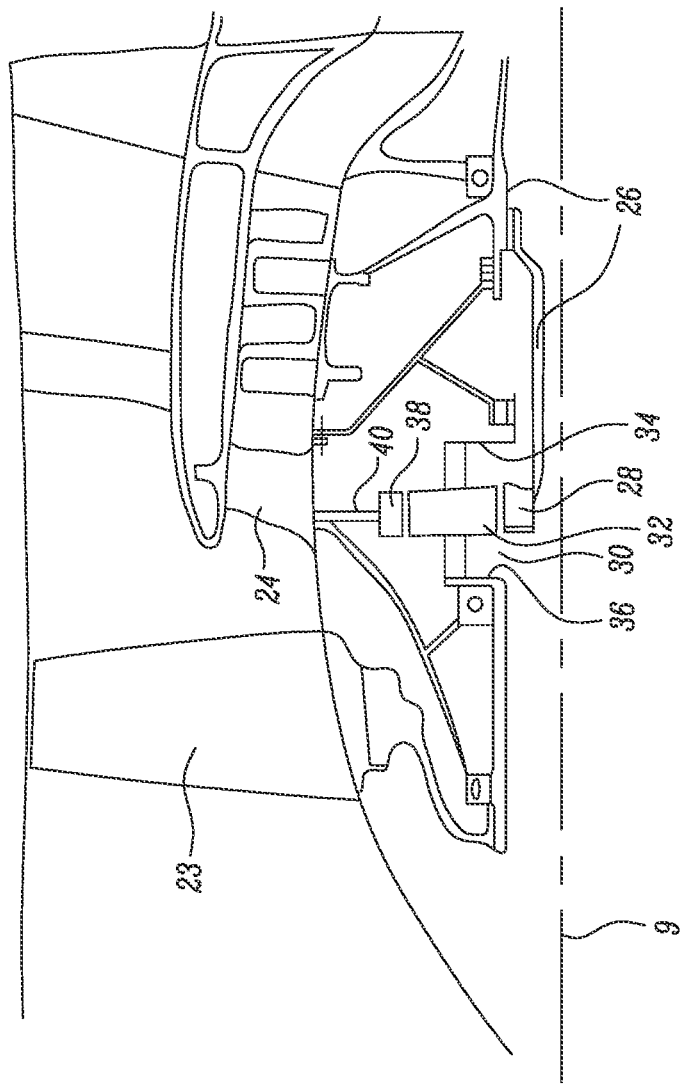
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
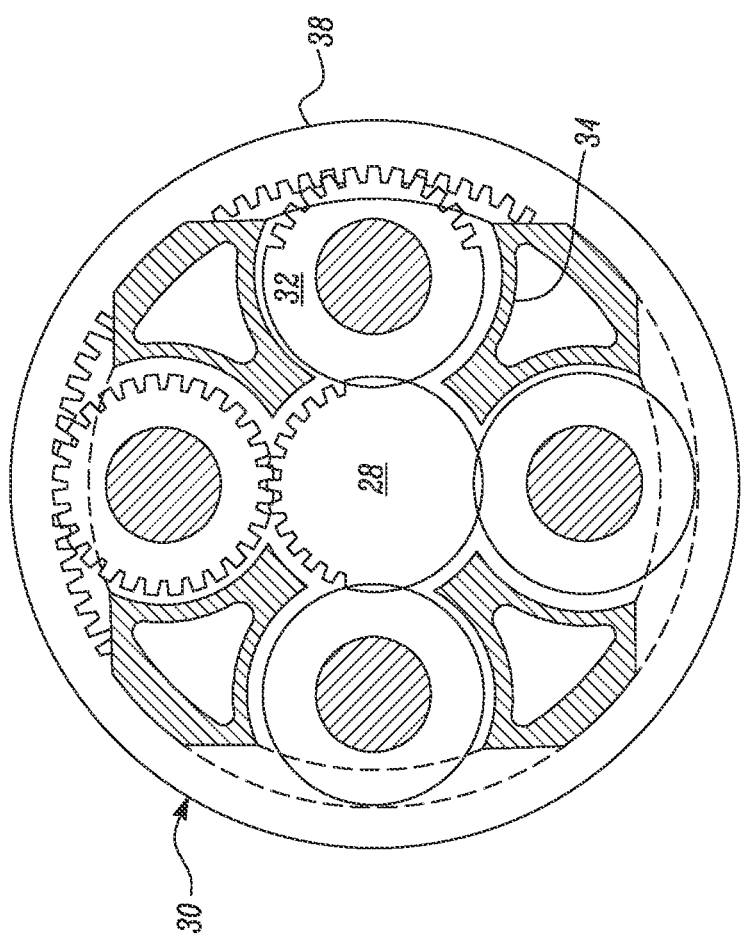
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the engine core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the principal rotational axis 9), a radial direction (in the bottom-to-top direction in FIG. 1), and a circumferential direction (perpendicular to the page in the FIG. 1 view). The axial, radial and circumferential directions are mutually perpendicular.

In addition, the present invention is equally applicable to aero gas turbine engines, marine gas turbine engines and land-based gas turbine engines.

Referring to FIG. 1, at least one of the compressors 14, 15 and the turbines 17, 19 includes multiple stages having rotor blades in rotor blade rows and stator vanes in stator vane rows. Any one of the stator vane rows in the gas turbine engine 10 may be a variable stator vane (VSV) row. Such a variable stator vane row includes a variable vane mechanism that allows the angle of the vanes (for example, the angle of incidence of the vanes) to be adjusted during use. Purely by way of example, the gas turbine engine 10 shown in FIG. 1 has a VSV row at an inlet to the engine core 11 of the gas turbine engine 10 in the form of a variable inlet guide vane (VIGV) row 50.

Figure 4B:
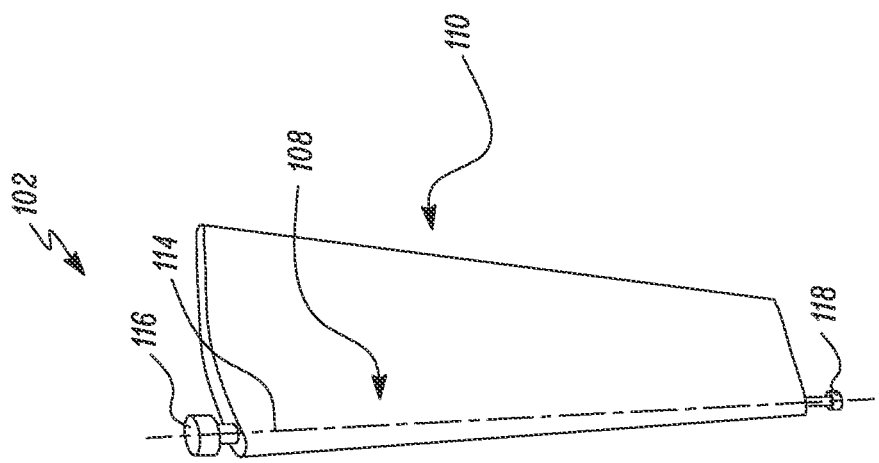
FIG. 4B is a perspective view of a variable stator vane.
Figure 4A:
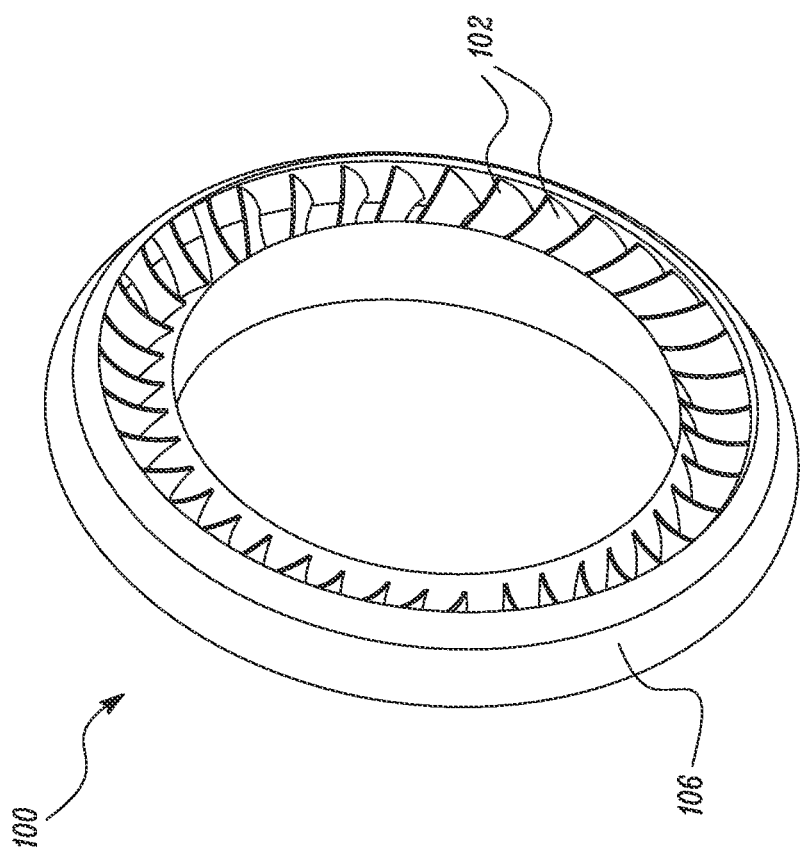
FIG. 4A is a perspective view of a variable stator vane assembly.

FIG. 4A shows an exemplary variable stator vane assembly 100 that can be used in the gas turbine engine 10. The variable stator vane assembly 100 includes a plurality of circumferentially arranged variable stator vanes 102. The variable stator vanes 102 are arranged in an annular casing 106. FIG. 4B shows a detailed view of one of the variable stator vanes 102. Each variable stator vane 102 includes a spindle section 108 and at least one aerofoil section 110. In the example illustrated in FIG. 4B, the variable stator vane 102 includes one aerofoil section 110. The spindle section 108 is located at one end of the aerofoil section 110. An actuator (not shown) may be used to vary the angle of the variable stator vane 102. The spindle section 108 defines a spindle axis 114 along its length. The variable stator vane 102 can be rotated about the spindle axis 114. Specifically, the aerofoil section 110 may be rotated about the spindle axis 114 to adjust the angle of the variable stator vane 102.

The spindle section 108 of the variable stator vane 102 is mounted to the casing 106 via a top mounting 116 and a bottom mounting 118. The top mounting 116 may be attached to the actator. The bottom mounting 118 may be movably received in a bearing (not shown). The bottom mounting 118 may rotate freely when the top mounting 116 is actuated.

In this example, the spindle section 108 and the aerofoil section 110 are formed from at least one fibre sheet. In a further example, the spindle section 108 is formed from at least one continuous fibre sheet wrapped around the spindle axis 114 of variable stator vane 102. The at least one aerofoil section 110 is at least partially formed from an excess of material from the at least one continuous fibre sheet, as will be explained in more detail below.

Figure 5:
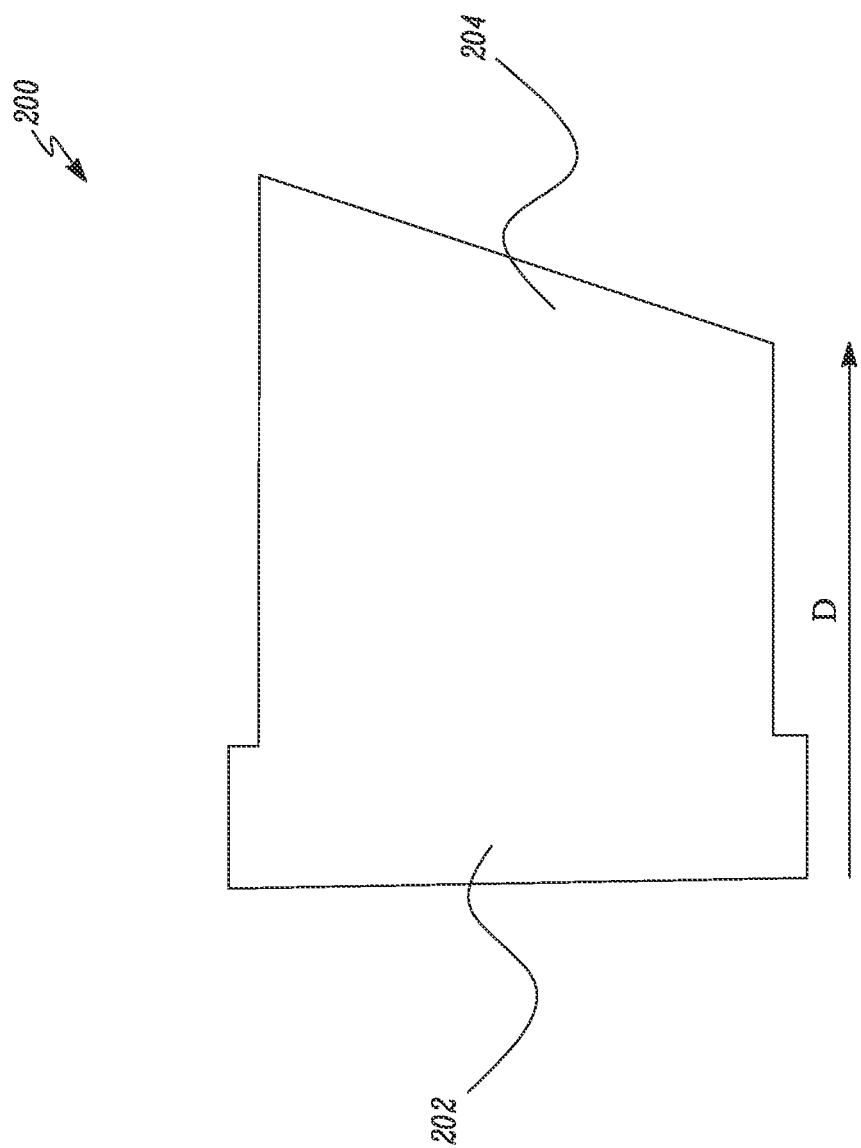
FIG. 5 is a top view of a fibre sheet used for fabricating a variable stator vane.

FIG. 5 shows a fibre sheet 200 used to fabricate the variable stator vane 102 of FIG. 4A. The fibre sheet 200 is interchangeably referred to as "the at least one fibre sheet 200". In some examples, the fibre sheet 200 includes a carbon fibre sheet. In some examples, the fibre sheet 200 includes a unidirectional fibre sheet. In some other examples, the fibre sheet 200 includes a bi-directional or biaxial fibre sheet. In some other examples, the fibre sheet 200 includes a multi-directional fibre sheet. In some other examples, the fibre sheet 200 includes a combination of unidirectional, biaxial and multi-directional fibre sheets. For example, the fibre sheet 200 may be made of 0 degree fibre, 0/90 degree fibre and +/−45 degree fibre. A suitable configuration of the fibre sheet 200 may be chosen based on the expected loads on the variable stator vane 102 and to provide adequate stiffness in the 0 degree direction (i.e., vertically down the length of the spindle section 108 along the spindle axis 114). For example, 0/90 degree fibre may be used to resist air and impact loads, while +/−45 degree fibre may be used to resist torsion from when the variable stator vane 102 is actuated or impacted which can cause the variable stator vane 102 to twist.

In the example illustrated in FIG. 5, the fibre sheet 200 is a continuous fibre sheet. However, the variable stator vane 102 may be formed from one or more continuous fibre sheets.

The fibre sheet 200 may be impregnated with a polymeric material. In other words, a polymeric material may be applied to the fibre sheet 200. The polymeric material includes a resin, a binder or a combination thereof. For example, the polymeric material used for impregnating the fibre sheet 200 may include a bismaleimide, such as Solvay 5250-4 or Hexcel M65. In another example, the polymeric material used for impregnating the fibre sheet 200 may include a polyimide, such as MVK-14.

The fibre sheet 200 includes a first portion 202 and a second portion 204. The first portion 202 is rolled to at least partially form the spindle section 108. One or more turns of the second portion 204 may also be used to form the spindle section 108. After forming the spindle section 108, an excess of material from the fibre sheet 200 may remain.

Dimensions of the fibre sheet 200 may be chosen according to the desired dimensions of the variable stator vane 102. The first portion 202 may be substantially rectangular. A length and a width of the first portion 202 may be in proportion to a length and a diameter, respectively, of the spindle section 108. The second portion 204 may be approximately trapezoidal. A height and a maximum width of the second portion 204 may correspond to a height and a maximum width, respectively, of the aerofoil section 110.

Figure 6:
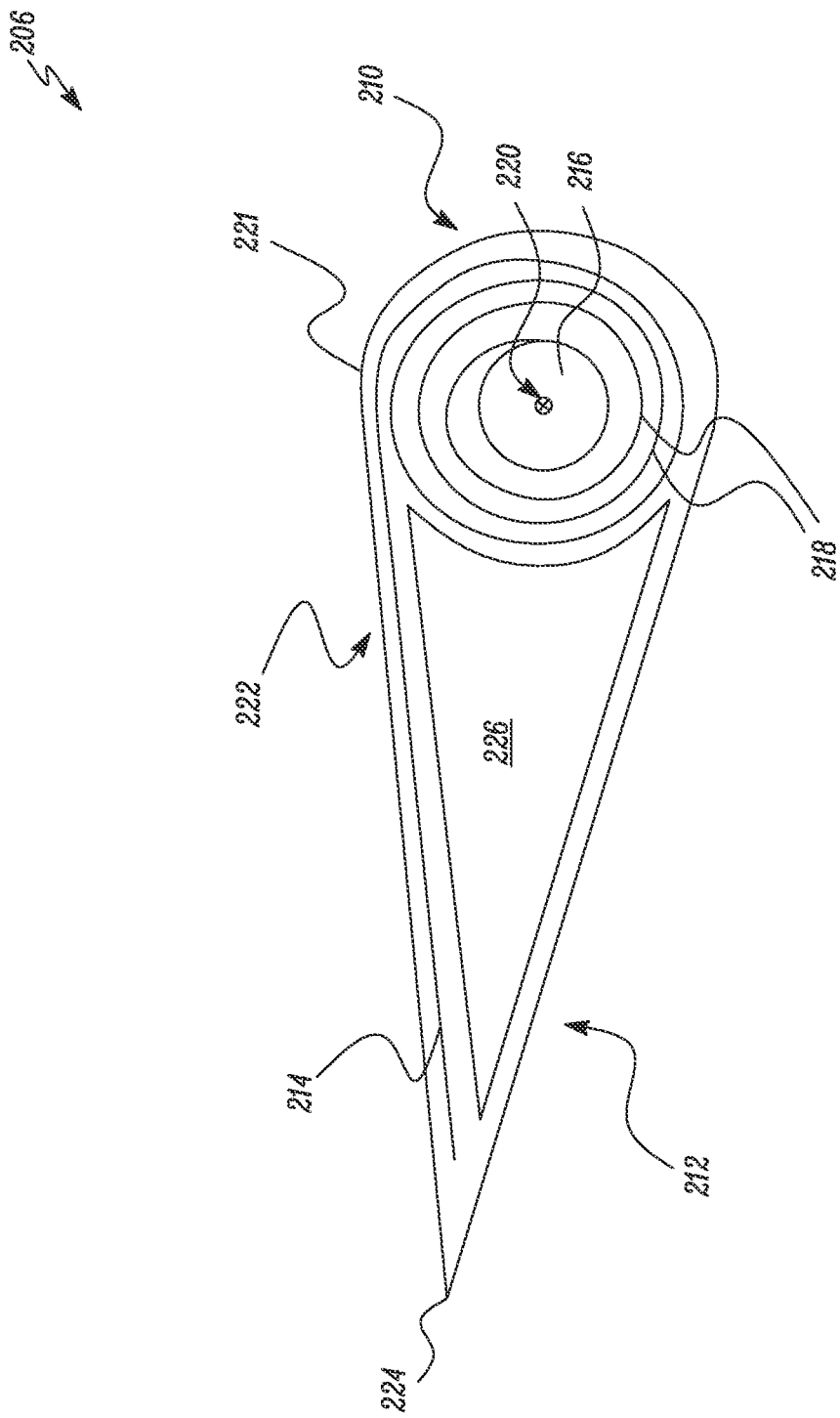
FIG. 6 is a top view of a variable stator vane.

The fibre sheet 200 is rolled in a direction D. FIG. 6 illustrates a variable stator vane 206 formed by rolling the fibre sheet 200 of FIG. 5. The variable stator vane 206 may undergo further processes to form the variable stator vane 102 of FIG. 4A. The variable stator vane 206 includes a spindle section 210 formed by rolling the fibre sheet 200 and an at least one aerofoil section 212 at least partially formed from an excess of material 214 that remains after the rolling. In the illustrated examples, the variable stator vane 206 includes one aerofoil section 212. In some other examples, a variable stator vane may include multiple aerofoil sections. The aerofoil section 212 of the variable stator vane 206 is formed by using the excess of material 214 of the fibre sheet 200.

The excess of material 214 may transfer the loads from the spindle section 210 to the aerofoil section 212. Due to the trapezoidal shape of the fibre sheet 200, the variable stator vane 206 may extend more into an airflow from an uppermost part of the spindle section 210. This may reduce loads on the material of the variable stator vane 206 and reduce a possibility of failure at the uppermost part of the spindle section 210. The aerofoil section 212 shown in FIG. 6 may be an intermediate aerofoil that has to undergo further processes to form the aerofoil section 110 of FIG. 4A.

In some examples, the fibre sheet 200 is rolled around a mandrel 216 to form the spindle section 210 of the variable stator vane 206. The mandrel 216 may have a solid cylindrical configuration. A material of the mandrel 216 may depend upon the polymeric material used in the impregnation of the fibre sheet 200. In some examples, the mandrel 216 may be formed from aluminium. In some other examples, the mandrel 216 may be formed from steel. In some other examples, the mandrel 216 may include carbon. In some examples, the mandrel 216 may be retained as part of the variable stator vane 206. In some other examples, the mandrel 216 may be removed after rolling.

As shown in FIG. 6, the spindle section 210 includes a plurality of turns 218 of the fibre sheet 200 wrapped around a spindle axis 220. The spindle section 210 further includes the mandrel 216. The fibre sheet 200 is disposed around the mandrel 216. Specifically, the plurality of turns 218 of the fibre sheet 200 is rolled around the mandrel 216.

The polymeric material used to impregnate the fibre sheet 200 may make the surfaces of the turns 218 tacky, which may prevent the fibre sheet 200 from unrolling during fabrication. The surfaces may also be provided with an adhesive to prevent unrolling.

The variable stator vane 206 further includes an outer layer of fibre sheet 222 (hereinafter referred to "the outer layer 222") disposed over the spindle section 210 and the aerofoil section 212. In some examples, a further fibre sheet 221 is provided over the spindle section 210 and the aerofoil section 212 to provide the outer layer 222 of the variable stator vane 206. The outer layer 222 starts and terminates at a trailing edge 224 of the variable stator vane 206. In some examples, the variable stator vane 206 is sealed with the polymeric material. The polymeric material is applied over the spindle section 210 and the at least one aerofoil section 212. The sealing of the variable stator vane 206 helps ensure the fibres of the fibre sheet 200 are covered.

In this example the variable stator vane 206 further includes a wedge of material 226. The wedge of material 226 may be disposed in a space that remains after rolling of the fibre sheet 200. In some examples, the wedge of material 226 may include carbon fibre. In some other examples, the wedge of material 226 may include carbon foam. The wedge of material 226 may provide additional strength and rigidity to the variable stator vane 206.

Figure 7:
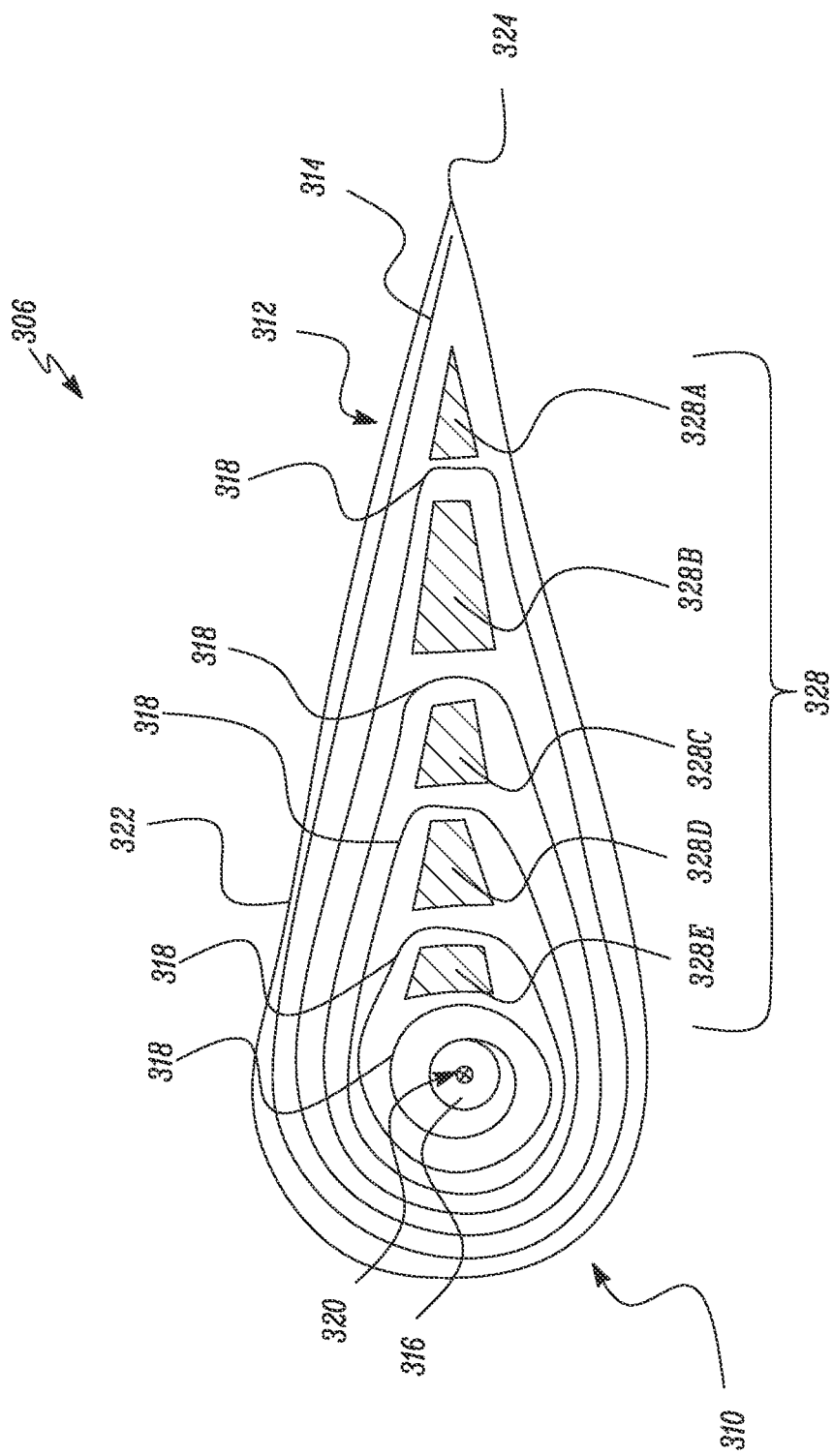
FIG. 7 is a top view of a variable stator vane including one or more inserts.

FIG. 7 shows another variable stator vane 306 formed by rolling the fibre sheet 200 shown in FIG. 5. The variable stator vane 306 is similar to the variable stator vane 206 of FIG. 6. Like the variable vane 206 of FIG. 6, the variable stator vane 306 includes a spindle section 310, an aerofoil section 312, an excess of material 314, a mandrel 316, a plurality of turns 318, a spindle axis 320, an outer layer 322 and a trailing edge 324. However, the variable stator vane 306 further includes at least one insert 328.

The at least one insert 328 may impart additional stiffness vertically across a width of the variable stator vane 306. The at least one insert 328 may function like a spar within the aerofoil section 312. The at least one insert 328 may be an elongate member extending at least partly along a length of the variable stator vane 306 to provide support to the variable stator vane 306. The at least one insert 328 may include one large insert or multiple smaller inserts. In the example illustrated in FIG. 7, the at least one insert 328 includes multiple smaller inserts, namely, a first insert 328A, a second insert 328B, a third insert 328C, a fourth insert 328D, and a fifth insert 328E. The inserts 328A-328E may have a same length along the spindle axis 320. The fibre sheet 200 is rolled around each of the inserts 328A-328E. The inserts 328 are disposed between adjacent turns 318 of the spindle section 310. The first insert 328A is disposed near the trailing edge 324 and has a triangular cross-section for the formation of the aerofoil section 312. The fifth insert 328E is disposed near the spindle axis 320. Each of the inserts 328B-328E has a trapezoidal cross-section having different heights and widths, though alternative shapes could be used for the inserts. In some examples, the excess of material 314 of the fibre sheet 200 is wrapped around the inserts 328A-328E.

Figure 8:
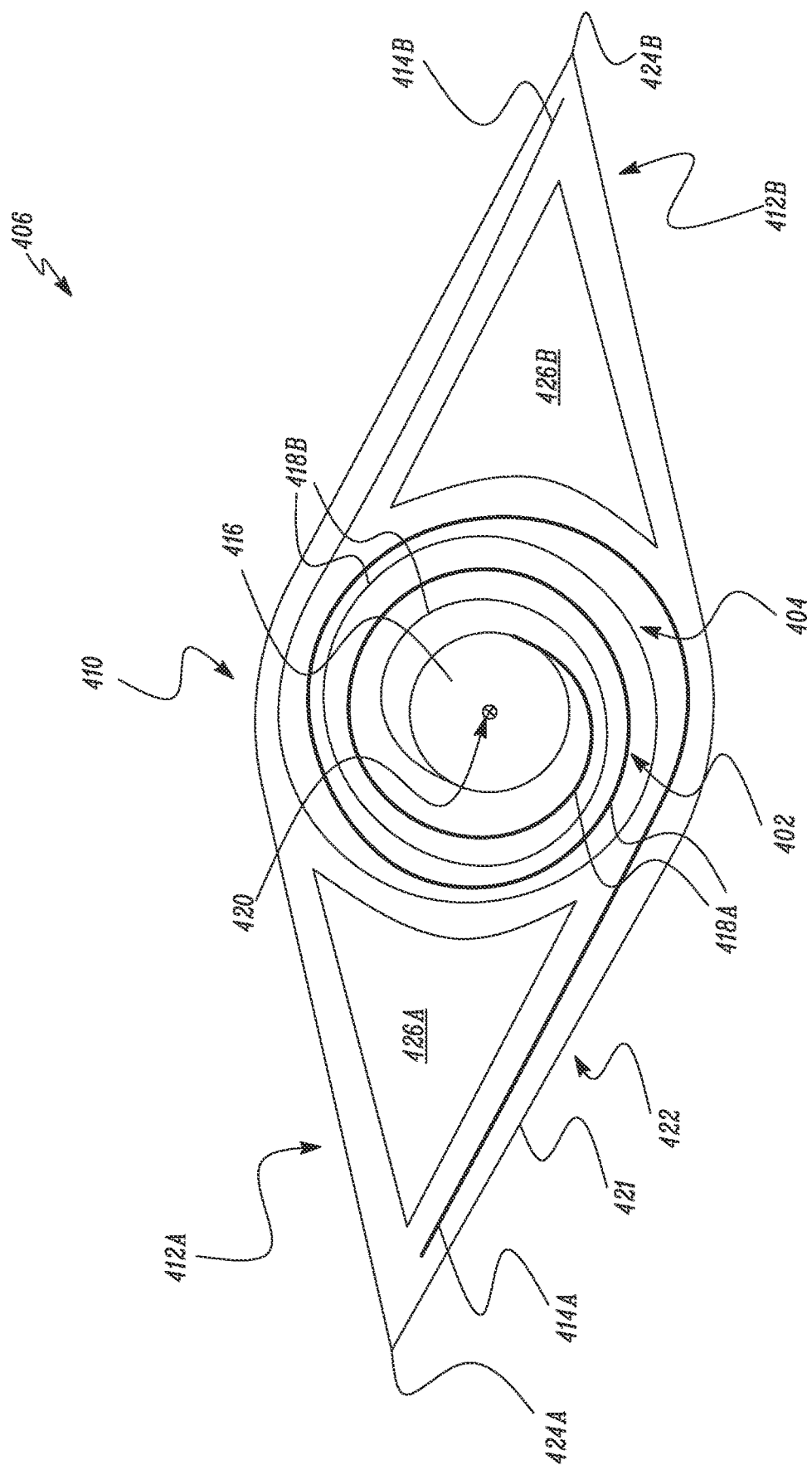
FIG. 8 is a top view of a variable stator vane including two aerofoil sections.

FIG. 8 shows a top view of a variable stator vane 406 formed by rolling two fibre sheets. The variable stator vane 406 has various portions similar to the variable stator vane 206 of FIG. 6 in that the variable stator vane 406 includes a spindle section 410, a mandrel 416, a spindle axis 420, and an outer layer 422. However, unlike the stator vane 206 of FIG. 6, the stator vane 406 of FIG. 8 includes two aerofoil sections 412A, 412B that extend in opposite directions.

The variable stator vane 406 with two aerofoil sections 412A, 412B is formed by rolling a first fibre sheet 402 and a second fibre sheet 404 around the axis 420 to form the spindle section 410 so as to leave a first excess of material 414A and a second excess of material 414B. As can be seen from FIG. 8, the starting points on the mandrel from which the first fibre sheet 402 and the second fibre sheet 404 are rolled are different, in this case by half a turn (that is, 180 degrees). The first fibre sheet 402 is rolled around the mandrel 416 to form a plurality of first turns 418A. The second fibre sheet 404 is rolled around the mandrel 416 to form a plurality of second turns 418B adjacent to the plurality of first turns 418A. The turns 418A, 418B of the first and second sheets 402, 404 along with the mandrel 416 may form the spindle section 410 of the variable stator vane 406.

The first aerofoil section 412A is at least partially formed from the first excess of material 414A from the first fibre sheet 402. The second aerofoil section 412B is at least partially formed from the second excess of material 414B from the second fibre sheet 404. The first aerofoil section 412A includes a first trailing edge 424A, while the second aerofoil section 412B includes a second trailing edge 424B. The spindle section 410 and the first and second aerofoil sections 412A, 412B are covered with a further fibre sheet 421 to provide the outer layer 422 of the variable stator vane 406. The outer layer 422 may be provided by one continuous fibre sheet. The variable stator vane 406 further includes a first wedge of material 426A and second wedge of material 426B. The first wedge of material 426A is disposed in the first aerofoil section 412A. The second wedge of material 426B is disposed in the second aerofoil section 412B.

Figure 9:
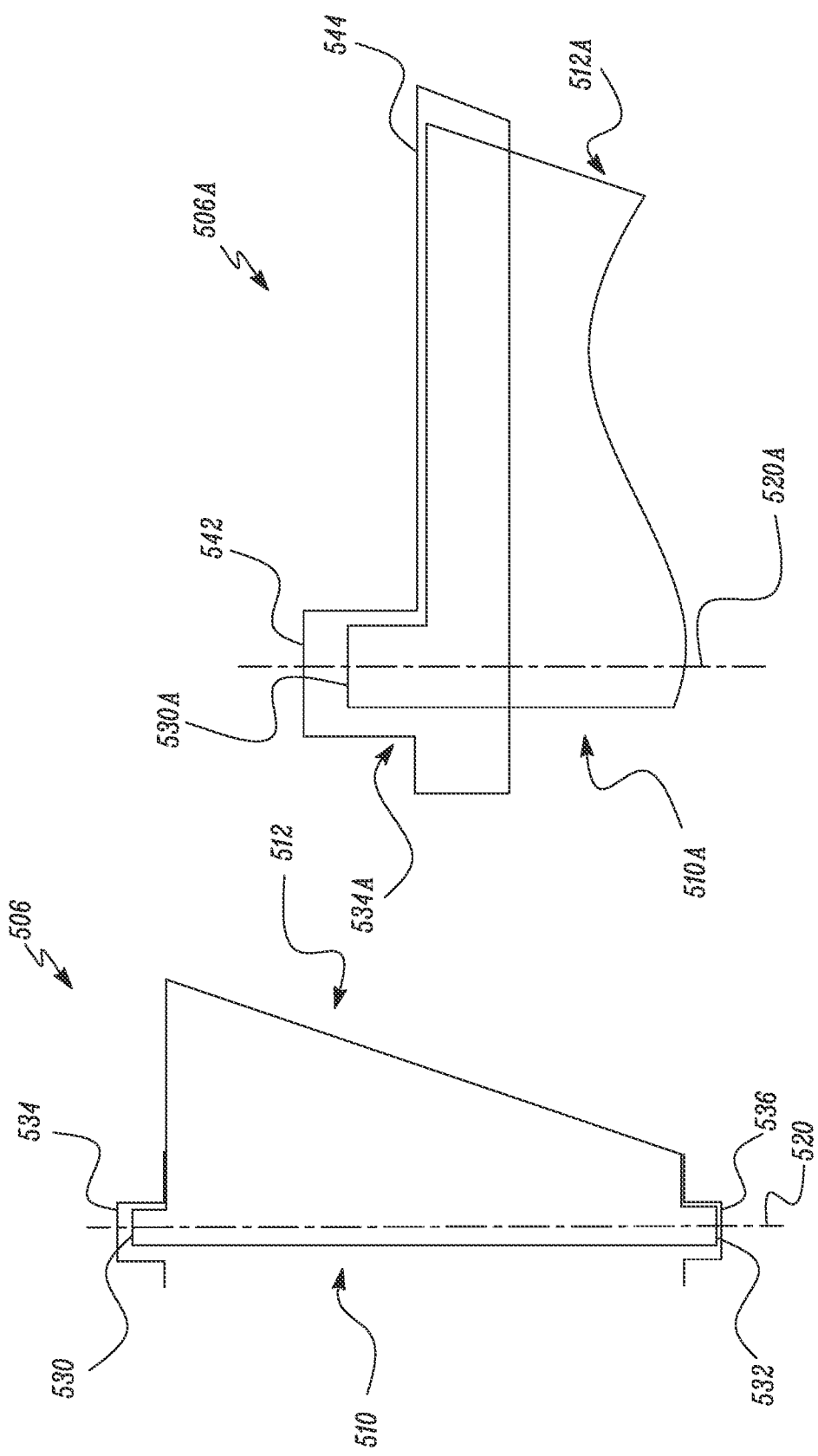
FIG. 9A is a side view of a variable stator vane including two bushings.
FIG. 9B is a partial side view of a variable stator vane including a bushing.

FIG. 9A shows a variable stator vane 506 with bushings. The variable stator vane 506 is similar to the variable stator vane 102 of FIG. 4A. The variable stator vane 506 includes a spindle section 510, an aerofoil section 512, and a spindle axis 520. The variable stator vane 506 may be formed from a single continuous fibre sheet similar to the variable stator vane 206 of FIG. 6.

The spindle section 510 includes a top end 530 and a bottom end 532 opposite to the top end 530 with respect to the spindle axis 520. The top and bottom ends 530, 532 may extend axially relative to the aerofoil section 512. The top end 530 may fit into an actuation lever, while the bottom end 532 may be received in a guide bush. The variable stator vane 506 further includes a top bushing 534 attached to the top end 530 of the spindle section 510. In some examples, the top bushing 534 is elongate in a direction that is perpendicular to the spindle axis 520. The variable stator vane 506 further includes a bottom bushing 536 attached to the bottom end 532 of the spindle section 510. The top and bottom bushings 534, 536 may be made of metal, for example, titanium. In some examples, each of the top and bottom ends 530, 532 of the spindle section 510 may also be capped with a wear resistant material, such as titanium, in order to reduce wear and tear. For example, a titanium fitting (not shown) may be disposed on the top and bottom ends 530, 532.

FIG. 9B shows a partial view of another variable stator vane 506A. The variable stator vane 506A is similar to the variable stator vane 506 of FIG. 9A and includes a spindle section 510A, an aerofoil section 512A, and a spindle axis 520A. The spindle section 510A includes a top end 530A.

The variable stator vane 506A further includes a top bushing 534A connected to the top end 530A of the spindle section 510. As shown in FIG. 9B, the top bushing 534A is elongate in a direction that is perpendicular to the spindle axis 520A. The top busing 524 extends perpendicular to the spindle axis 520A and covers an uppermost portion of the aerofoil section 512A. The top bushing 534A may have a top portion 542 disposed adjacent to the top end 530A of the spindle section 510A and an elongate portion 544 extending perpendicular to the spindle axis 520A. In some applications, an actuation load may be expected to be high for a composite material. The top bushing 534A may supplement torque transfer by increasing a surface area of reaction when the variable stator vane 506A is actuated. This may reduce local stresses in the variable stator vane 506A. The increase in surface area may be achieved by extending the top bushing 534A to cover the uppermost portion of the aerofoil section 512.

Figure 10:
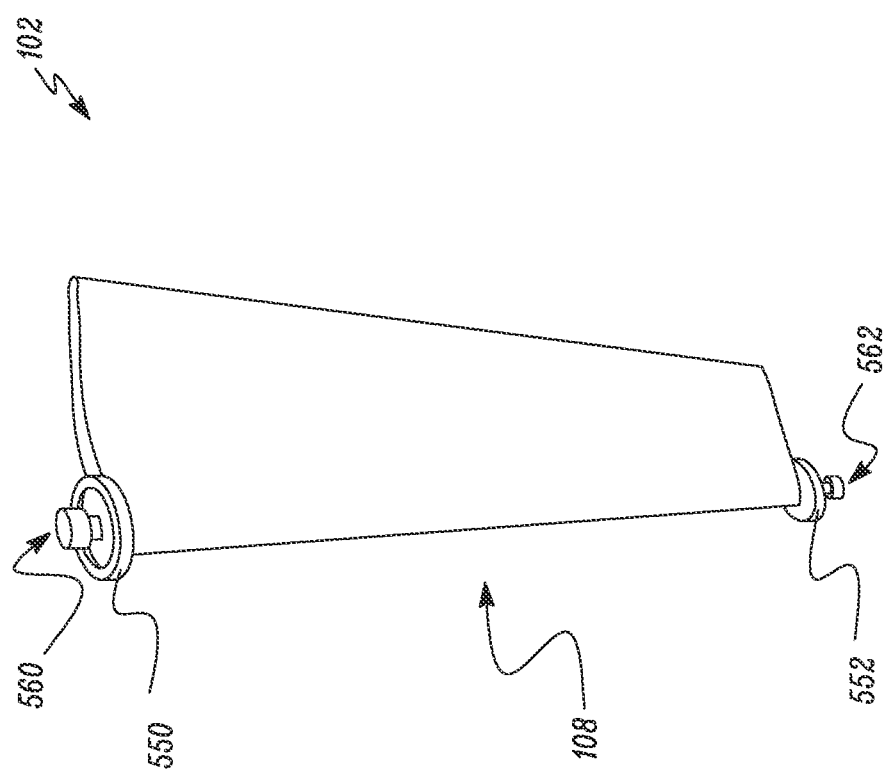
FIG. 10 is a perspective view of the variable stator vane shown in FIG. 4A including two metal fittings.

FIG. 10 shows the variable stator vane 102 including a top metal fitting 550 at a top end 560 of the spindle section 108 and a bottom metal fitting 552 at a bottom end 562 of the spindle section 108. Each of the top and bottom metal fittings 550, 552 may made of a material including titanium. Each of the top and bottom metal fittings 550, 552 may have a disc-shaped configuration or a penny-shaped configuration. The top metal fitting 550 is attached over the top end 560 of the spindle section 108 to react against an actuation lever. The bottom metal fitting 552 is attached over the bottom end 562 of the spindle section 108. The top metal fitting 550 and the bottom metal fitting 552 may relieve local stresses at the top end 560 and the bottom end 562, respectively, with the penny-shaped configuration.

In some examples, a variable stator vane of the present disclosure may undergo a shaping process to finalize its shape. An aerofoil tool may be used for shaping the variable stator vane.

Figure 11A:
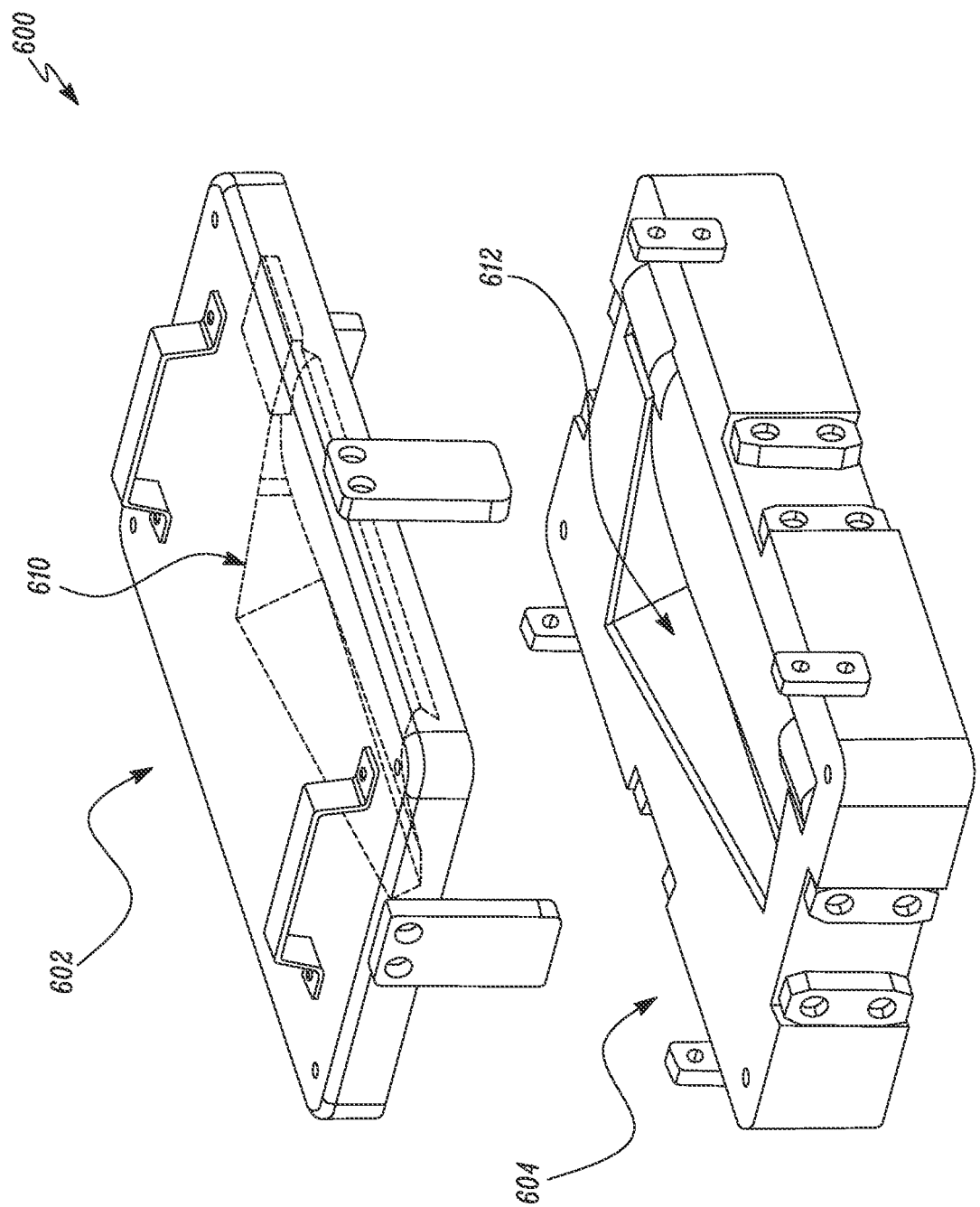
FIGS. 11A-11B are exploded and sectional views of an aerofoil tool.
Figure 11B:
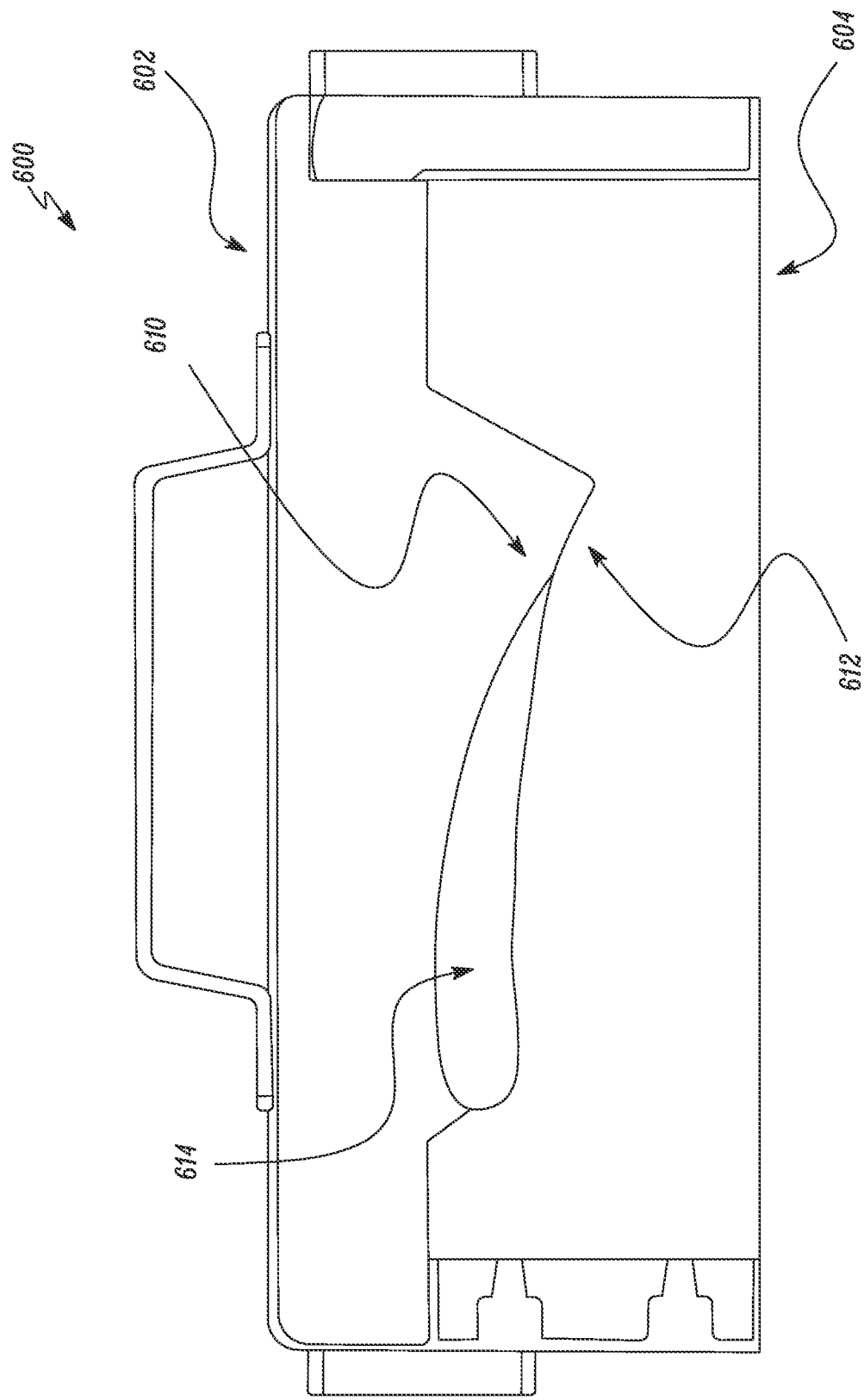

FIG. 11A shows an exploded view of an aerofoil tool 600 for fabricating the variable stator vane 206. FIG. 11B shows a sectional side view of the aerofoil tool 600. The aerofoil tool 600 includes a first part 602 and a second part 604 removably connected to the aerofoil tool 600. The first part 602 includes a male aerofoil tool 610. The second part 604 includes a female aerofoil tool 612. The male aerofoil tool 610 is at least partially received within the female aerofoil tool 612. Upon assembly of the first and second parts 602, 604, the male and female aerofoil tools 610, 612 define a cavity 614 therebetween. A variable stator vane (for example, the variable stator vane 206 of FIG. 6) is received within the cavity 614. The excess of material 214 of the fibre sheet 200 may be pressed between the male aerofoil tool 610 and the female aerofoil tool 612. The male aerofoil tool 610 and the female aerofoil tool 612 may provide a final shape to the variable stator vane 206.

Figure 12B:
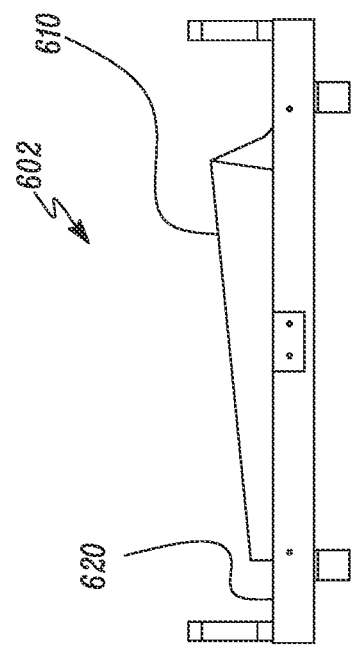
FIGS. 12A-12B are top and side views of a male aerofoil tool.
Figure 12A:
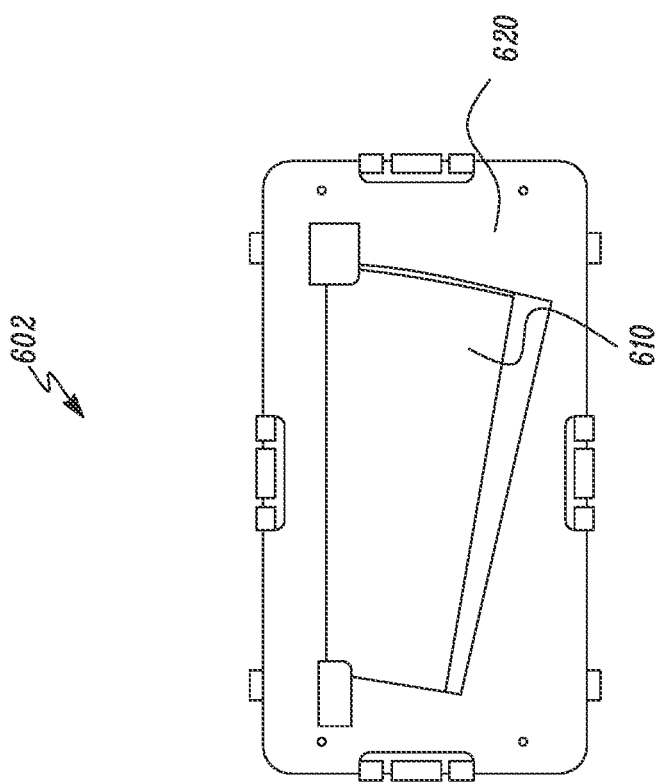
Figure 13:
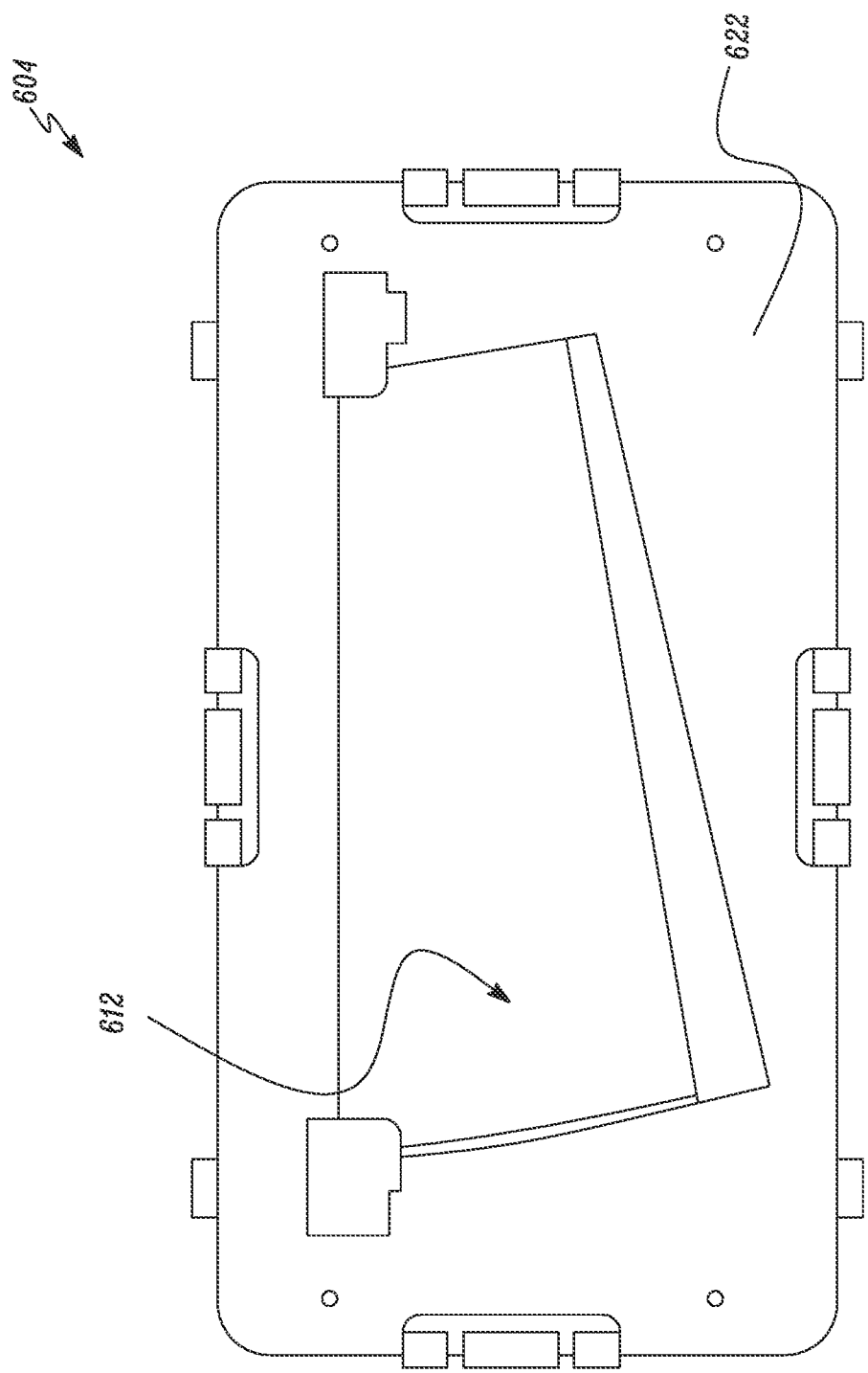
FIG. 13 is a top view of a female aerofoil tool.

FIGS. 12A and 12B show a top view and a side view, respectively, of the first part 602 including the male aerofoil tool 610. The male aerofoil tool 610 protrudes from a surface 620 of the first part 602. FIG. 13 shows a top view of the second part 604 including the female aerofoil tool 612. The female aerofoil tool 612 may be a recess extending from a surface 622 of the second part 604. A shape of the male aerofoil tool 610 and a shape of the female aerofoil tool 612 may depend on a desired shape of a variable stator vane. A variable stator vane fabricated by rolling one or more continuous fibre sheets around a mandrel may be pressed between the male aerofoil tool 610 and the female aerofoil tool 612 to provide the desired shape.

Figure 14:
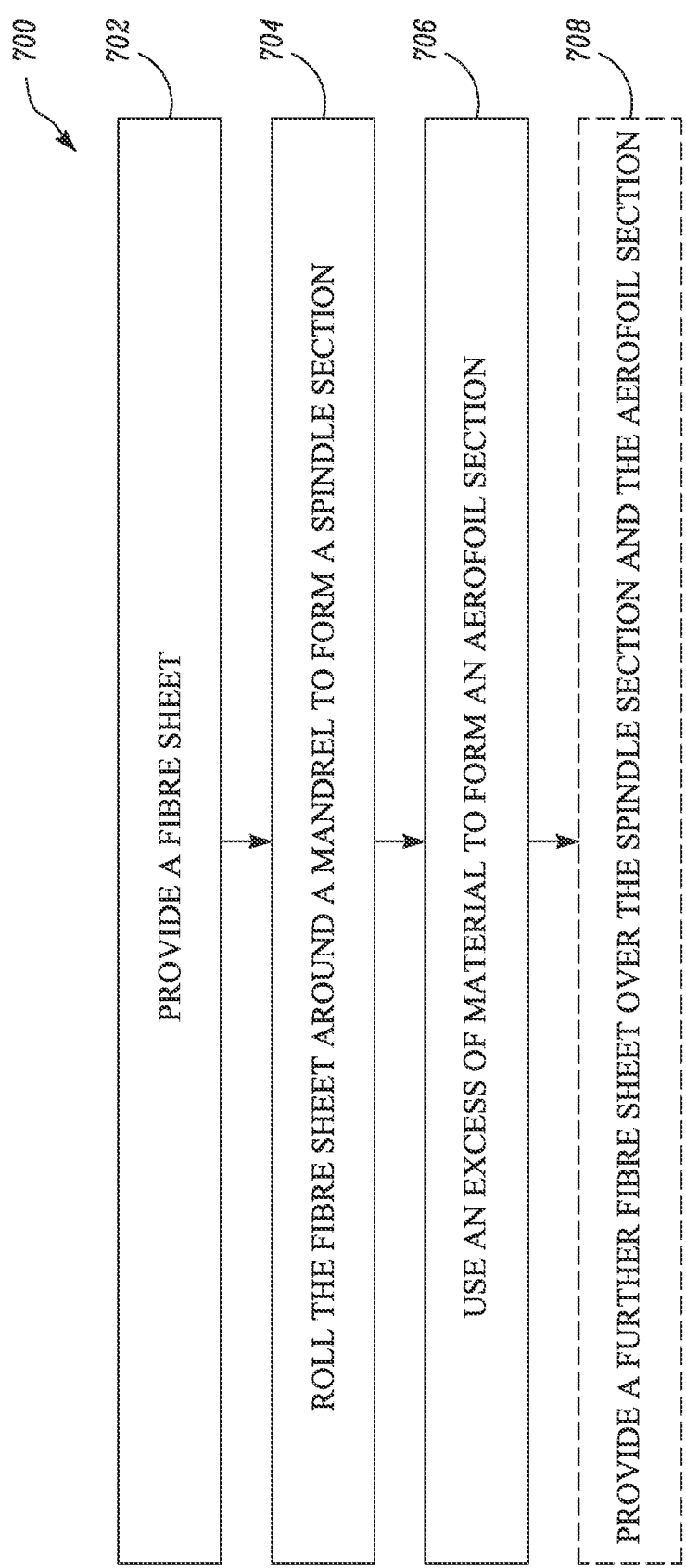
FIG. 14 is a flowchart of a method of fabricating a variable stator vane.

FIG. 14 is a flow chart showing a method 700 of fabricating a variable stator vane. Reference will also be made to FIGS. 4-13.

At 702, the method 700 includes providing the at least one fibre sheet 200 for the fabrication of the variable stator vane 206. The at least one fibre sheet 200 may include a carbon fibre sheet. In some examples, the method 700 further includes impregnating the fibre sheet 200 with a polymeric material prior to rolling the fibre sheet 200 at 704. The polymeric material may be applied on the fibre sheet 200 such that the fibre sheet 200 includes an adhesive surface. The impregnation of the fibre sheet 200 may prevent unrolling of the fibre sheet 200 during fabrication. In some examples, the polymeric material includes a resin or a binder. In some examples, the at least one fibre sheet includes the first fibre sheet 402 and the second fibre sheet 404.

At 704, the method 700 further includes rolling the at least one fibre sheet 200 around the mandrel 216 to form the spindle section 210 of the variable stator vane 206. In some examples, rolling the at least one fibre sheet 200 around the mandrel 216 includes rolling the plurality of turns 218 of the fibre sheet 200 around the mandrel 216. In some examples, rolling the at least one fibre sheet 200 around the mandrel 316 includes rolling the turn 318 of the fibre sheet 200 around the insert 328 so that the insert 328 is disposed between two adjacent turns 318 of the spindle section 310.

In some examples, the female aerofoil tool 612 may be used for rolling the at least one fibre sheet 200 around the mandrel 216

In some other examples, rolling the at least one fibre sheet further includes rolling the first fibre sheet 402 and the second fibre sheet 404 around the mandrel 216 to form the spindle section 410.

The excess of material 214 of the at least one fibre sheet 200 remains after forming the spindle section 210. In some examples, the first excess of material 414A from the first fibre sheet 402 remains after forming the spindle section 410 and the second excess of material 414B from the second fibre sheet 404 remains after forming the spindle section 410.

In some examples, the method 700 further includes wrapping the excess of material 314 of the at least one fibre sheet 200 around the one or more inserts 328A-328E.

At 706, the method 700 further includes using the excess of material 214 of the at least one fibre sheet 200 to form the at least one aerofoil section 212 of the variable stator vane 206. In some other examples, the at least one aerofoil section includes the first aerofoil section 412A and the second aerofoil section 412B. In some examples, using the excess of material includes using the first excess of material 414A to form the first aerofoil section 412A and using the second excess of material 414B to form the second aerofoil section 412B.

In some examples, using the excess of material 214 further includes pressing the excess of material 214 of the at least one fibre sheet 200 between the male aerofoil tool 610 and the female aerofoil tool 612.

Optionally, at 708, the method 700 may further include providing the further fibre sheet 221 over the spindle section 210 and the aerofoil section 212 to provide the outer layer 222 of the variable stator vane 206.

The method 700 may further include applying a resin on the spindle section 210 and the aerofoil section 212. The resin may be used to seal the variable stator vane 206. The sealing of the variable stator vane 206 is done to ensure all the fibres of the fibre sheet 200 are covered.

One or more steps of the method 700 may be done manually or automatically. In some examples, a variable stator vane may be fabricated in one or more intermediate stages. For example, at least one fibre sheet may be successively wrapped around multiple inserts. A hand tool may be used to compact each individual insert as the corresponding wrap is applied to ensure conformity. The variable stator vane may be removed from the hand tool at each wrap and disposed in the female aerofoil tool 612. The next insert may be then applied, and another wrap applied over the next insert. The hand tool may be then used to compress the next insert to consolidate the variable stator vane.

The method 700 of fabricating the variable stator vane may be cost effective and time efficient. The method 700 may also result in a variable stator vane with reduced weight as compared to variable stator vanes manufactured by conventional methods. The method 700 may also reduce or eliminate tooling costs generally associated with other methods.

The method 700 may enable fabrication of the variable stator vane from a composite material. The composite material may substantially reduce the mass of variable stator vane as compared to a variable stator vane made of metal, such as titanium.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of fabricating a variable stator vane, the method comprising:
providing at least one fibre sheet;
rolling the at least one fibre sheet around a mandrel to form a spindle section of the variable stator vane, the spindle section having a spindle axis, wherein an excess of material of the at least one fibre sheet remains after forming the spindle section and a first portion of the at least one fibre sheet extends further in a direction along the spindle axis than a second portion of the at least one fibre sheet to form a projection in the spindle section; and using the excess of material of the at least one fibre sheet to form at least one aerofoil section of the variable stator vane.

2. The method of claim 1, wherein rolling the at least one fibre sheet around the mandrel comprises rolling a plurality of turns of the at least one fibre sheet around the mandrel.

3. The method of claim 1, further comprising wrapping the excess of material of the at least one fibre sheet around one or more inserts.

4. The method of claim 1, wherein rolling the at least one fibre sheet around the mandrel comprises rolling a turn of the at least one fibre sheet around an insert so that the insert is disposed between two adjacent turns of the spindle section.

5. The method of claim 1, further comprising providing a further fibre sheet over the spindle section and the at least one aerofoil section to provide an outer layer of the variable stator vane.

6. The method of claim 1, wherein using the excess of material further comprises pressing the excess of material of the at least one fibre sheet between a female aerofoil tool and a male aerofoil tool.

7. The method of claim 1, wherein the at least one fibre sheet comprises a first fibre sheet and a second fibre sheet, wherein rolling the at least one fibre sheet further comprises rolling the first fibre sheet and the second fibre sheet around the mandrel to form the spindle section, and wherein a first excess of material from the first fibre sheet remains after forming the spindle section and a second excess of material from the second fibre sheet remains after forming the spindle section.

8. The method of claim 7, wherein the at least one aerofoil section comprises a first aerofoil section and a second aerofoil section, and wherein using the excess of material comprises using the first excess of material to form the first aerofoil section and using the second excess of material to form the second aerofoil section.

9. A variable stator vane configured for rotation about a rotation axis, the variable stator vane comprising:

a spindle section formed from a first portion of an at least one continuous fibre sheet wrapped around a spindle axis of the variable stator vane; and at least one aerofoil section at least partially formed from an excess of material from a second portion of the at least one continuous fibre sheet, wherein the first portion of the at least one continuous fibre sheet extends further in a direction along the spindle axis then the second portion of the at least one continuous fibre sheet to form a projection in the spindle section.

10. The variable stator vane of claim 9, wherein the spindle section comprises a plurality of turns of the at least one continuous fibre sheet wrapped around the spindle axis.

11. The variable stator vane of claim 9, further comprising at least one insert.

12. The variable stator vane of claim 9, further comprising an outer layer of fibre sheet disposed over the spindle section and the at least one aerofoil section.

13. The variable stator vane of claim 9, wherein the spindle section further comprises a mandrel, and wherein the at least one continuous fibre sheet is disposed around the mandrel.

14. The variable stator vane of claim 9, wherein the at least one continuous fibre sheet comprises a first continuous fibre sheet and a second continuous fibre sheet, and wherein the spindle section is formed from the first continuous fibre sheet and the second continuous fibre sheet rolled around the spindle axis.

15. The variable stator vane of claim 14, wherein the at least one aerofoil section comprises a first aerofoil section and a second aerofoil section, wherein the first aerofoil section is at least partially formed from an excess of material from the first continuous fibre sheet, and wherein second aerofoil section is at least partially formed from an excess of material from the second continuous fibre sheet.

16. The variable stator vane of claim 9, further comprising at least one insert disposed within the aerofoil section, wherein the at least one insert has a triangular cross section.

17. The variable stator vane of claim 9, wherein the second portion of the at least one continuous fibre sheet is trapezoidal in shape.

18. The variable stator vane of claim 9, further comprising a plurality of inserts disposed within the aerofoil section.

19. The variable stator vane of claim 9, wherein the at least one continuous fibre sheet is impregnated with a polymeric material.

20. The variable stator vane of claim 9, wherein the spindle axis and the rotation axis are colinear.

* * * * *